(12) United States Patent
Gschwendtner et al.

(10) Patent No.: US 10,172,273 B2
(45) Date of Patent: Jan. 8, 2019

(54) DRAFT FORCE DETECTION ON A VEHICLE HAVING A LINKAGE

(71) Applicant: AGCO International GmbH, Hesston, KS (US)

(72) Inventors: Christian Gschwendtner, Marktoberdorf (DE); Guenther Ostenried, Marktoberdorf (DE); Werner Unsinn, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 10 days.

(21) Appl. No.: 15/423,007

(22) Filed: Feb. 2, 2017

(65) Prior Publication Data

US 2017/0215327 A1 Aug. 3, 2017

(30) Foreign Application Priority Data

Feb. 2, 2016 (GB) .................................. 1601875.6

(51) Int. Cl.
*A01B 63/00* (2006.01)
*A01B 63/112* (2006.01)
(Continued)

(52) U.S. Cl.
CPC ............ *A01B 63/00* (2013.01); *A01B 63/112* (2013.01); *A01B 76/00* (2013.01); *A01B 63/02* (2013.01); *A01B 63/14* (2013.01)

(58) Field of Classification Search
CPC ... A01B 63/1117; A01B 63/10; A01B 63/112; A01B 63/111; A01B 63/114;
(Continued)

(56) References Cited

U.S. PATENT DOCUMENTS

| 4,807,136 A | 2/1989 | Rutkowski |
| 4,886,123 A | 12/1989 | Winfried |

(Continued)

FOREIGN PATENT DOCUMENTS

| EP | 1889531 A1 | 2/2008 |
| EP | 2889515 A1 | 7/2015 |

(Continued)

OTHER PUBLICATIONS

European Patent Office, International Search Report for related EP Application No. EP17153073.6, dated Jun. 29, 2017.

(Continued)

*Primary Examiner* — Robert E Pezzuto

(57) ABSTRACT

A vehicle control system for controlling the height of a linkage on a vehicle having a continuously variable transmission (CVT) in which the linkage is automatically raised and lowered depending on a draft force detected by the vehicle including an input draft force detected by sensors in the CVT or driveline is inputted into the control system and the system further processes the input draft force to provide an output draft force upon which movement of the linkage is based and the control system processes the input draft force by compensating the input draft force detected during acceleration or deceleration and/or compensating the input draft detected whilst travelling along a slope, and/or equalizing the input draft force by applying a ramp function, and/or reducing the input draft force when the linkage is at a predetermined height.

11 Claims, 6 Drawing Sheets

(51) Int. Cl.
*A01B 76/00* (2006.01)
*A01B 63/02* (2006.01)
*A01B 63/14* (2006.01)

(58) Field of Classification Search
CPC ... A01B 63/102; A01B 59/043; A01B 59/041; A01B 63/00; A01B 63/02; A01B 63/14; A01B 76/00; B60D 1/30; F16H 47/04; F16H 61/425; F16H 61/435
USPC ...... 172/1–11, 239; 180/198, 89.13; 701/50, 701/70, 82, 90
See application file for complete search history.

(56) References Cited

U.S. PATENT DOCUMENTS

| | | | |
|---|---|---|---|
| 5,911,769 A * | 6/1999 | Orbach | A01B 63/112 |
| | | | 172/7 |
| 5,941,920 A * | 8/1999 | Schubert | F16F 15/02 |
| | | | 180/89.13 |
| 5,997,024 A | 12/1999 | Cowley | |
| 6,076,612 A * | 6/2000 | Carr | A01B 63/1117 |
| | | | 172/7 |
| 6,321,851 B1 | 11/2001 | Weiss et al. | |
| 7,721,813 B2 * | 5/2010 | Hou | A01B 63/112 |
| | | | 172/239 |
| 2002/0112864 A1 | 8/2002 | Scarlett | |
| 2003/0217852 A1 | 11/2003 | Bernhardt et al. | |
| 2015/0039188 A1 | 2/2015 | Schedgick | |
| 2016/0029542 A1 | 2/2016 | Gschwendtner et al. | |
| 2016/0029543 A1 * | 2/2016 | Stich | A01B 59/043 |
| | | | 701/50 |

FOREIGN PATENT DOCUMENTS

| | | |
|---|---|---|
| EP | 15177251.4 | 2/2016 |
| WO | 2013/053564 A1 | 4/2013 |
| WO | 2013/053645 A1 | 4/2013 |

OTHER PUBLICATIONS

UK Intellectual Property Office, International Search Report related for Priority UK Application No. GB1601875.6, dated Jul. 15, 2016.

* cited by examiner

| Time | 1 | 2 | 3 | 4 | 5 | 6 |
|---|---|---|---|---|---|---|
| Draft Force IN | 80 | 150 | 200 | 250 | 200 | 150 |
| Draft force OUT | 80 | 120 | 140 | 160 | 180 | 160 |

DRAFT FORCE DETECTION ON A VEHICLE HAVING A LINKAGE

BACKGROUND

Field of the Invention

The invention relates to a vehicle control system for a linkage on the vehicle. More specifically, the invention relates to a method for determining a draft force of a tractor and controlling a linkage on the tractor.

Description of Related Art

A hitch, such as a three-point linkage is a known arrangement used to attach implements to a vehicle, for example an agricultural tractor for towing. The implement may be fully-mounted or semi-mounted whereby a semi-mounted implemented has a wheel engaging with the ground during soil operation while a fully-mounted implement puts all its load on the three-point linkage.

Three point linkages most frequently consist of two lower lifting arms to which an implement is attached. The lower lifting arms can be pivoted by respective hydraulic actuating cylinders to adjust the height position of the implement relative to the tractor. Furthermore, these lower lifting arms may be manually adjusted in length and thus be adapted to the type of implement to be attached. An additional top link connects the implement to the tractor on a level above the lower lifting arms. This top link is used to pivot the implement about a horizontal transverse axis and is adjustable by means of a threaded connection, or a hydraulic cylinder.

Alternative designs of three-point linkages are known, such as the arrangements shown in U.S. Pat. No. 6,321,851, US2003/217852 and U.S. Pat. No. 5,997,024 in which the lower links are replaced by two, or four variable length hydraulic rams. This variable length ram arrangement enables multi axis movement of any implement attached to the linkage.

To control the three-point linkage, modern tractors are mainly equipped with electronic linkage control systems to improve the work quality of the machine and the operator's comfort during operation.

Such electronic linkage control systems operate in three well known modes:

Position control mode: In general, the tractor speed is kept constant by a speed control system and the position of the lower lifting arms is sensed directly, or indirectly so that the working depth of the implement in the soil can be adjusted within limits set by the operator whilst the speed of the tractor is kept constant. In the position control mode, the height of the linkage is determined by a function, H which relies solely on a height position component HP inputted or controlled by the operator via a depth controller.

Draft control mode: The implement is raised and lowered in the soil automatically depending on the draft force applied by the implement to reduce fuel consumption, avoid engine stall or avoid damage of the implement or tractor. Again, vehicle speed is kept constant. If the implement is lowered into the ground an initial draft is applied defining a zero level. The operator can then set a value representing a force increase which means that the operator can decide how fast the implement is lifted when a small force increase or a large force increase occurs. The value of the force entered by the operator does not represent an exact value of the force applied, e.g. 5 kN, but defines the responsiveness of the draft control. The objective of this function is to move the implement while avoiding excessive draft or pull force variations. Therefore, a draft force sensor, typically in the form of a draft force sensing pin which connects the lower lifting arms to the tractor chassis is used to measure the horizontal load applied to the tractor by the implement. In the draft control mode, the height of the linkage is determined by a function, H which relies on a height draft component HD resulting from the draft force.

Intermix control mode: This control arrangement, as its name implies is a mixture of position and draft control modes in which a draft control system can only lift the implement within a limited range of positions. This function is provided to avoid excessive movement of the implement in the soil resulting in poor working quality. Again, vehicle speed is kept constant by a speed control system. In the intermix control mode, the height of the linkage is determined by a function H which relies on both the height draft component HD (from the draft control mode) and the height position component HP (from the position control mode). A mix controller can vary the ratio of HD:HP and thus vary the influence from each of the position and draft control modes.

Only the draft control and intermix mode (both referred to as draft modes) operate under measurement of the draft force. Generally, deactivating the draft modes results in that the system enters the position mode with no draft force influencing the lifting heights. It may, however be difficult to install a draft force sensing pin due to the complex three-dimensional geometry of a linkage.

The applicant's pending application WO2013/053645 describes an electronic linkage control wherein the draft force sensing pin is omitted and the variation of the draft force of the linkage is determined from the variation in the hydraulic drive circuit pressure. As described in WO2013/053645, such systems may also be used for implements which are simply towed by connection to e.g. a ball hitch, rather than being hitch mounted. Different to fully-mounted implements the weight of the implement mainly rests on the ground via the implement wheels and actuators are provided on the implements controlling linkage thereon to raise and lower soil engaging means. The actuators, mainly hydraulic actuating cylinders similar to those used for three point linkages, are thereby supplied and controlled by the hydraulic supply system and valve arrangements of the tractor in known manner.

Furthermore, an implement may be semi-mounted, which means that the implement is mounted to the lower lifting arms of the tractor and further may be equipped with a ground engaging wheel so that the weight of the implement rests on the lower links and the ground via the implement wheels. To raise and lower the soil engaging means of the implement, the linkage of the tractor and the linkage of the implement must be adjusted conjointly.

Accordingly, the term "linkage" may be understood as not limited to a three-point linkage of a tractor, but also includes linkages to move soil engaging means of towed implements.

Normally, in the draft mode, the operator sets a value indicative of an acceptable draft force (depending on the condition of the ground and desired vehicle speed). If the draft force then rises continuously because a plough in the ground has hit a rock, the draft control will move the linkage and therefore the plough upwards so that the draft force is reduced. If the draft force is reduced, the control will then lower the linkage and plough back again into ground. In this way, the plough will automatically pass a rock in the ground avoiding damage to it.

However, the determination of the draft force based on CVT (Continuously Variable Transmission) parameters encounters problems in some vehicle operating conditions.

In the case where an implement is attached to a linkage of a tractor, the operator is ordinarily responsible for deactivating the draft or intermix control modes manually when travelling along a road with an implement held in a lifted position. If this is not done the draft force determined by the CVT delivers a significant change of draft signal when the roll of the tractor changes, or the vehicle travels uphill, or downhill or during acceleration. This can result in the implement being lowered to the ground, or lifted when there is no need.

In the case of acceleration to a new speed regardless of the position of the implement, the change of draft signal may result in unintentional movement of the linkage. The faster the vehicle is going, the greater is the risk of damage through unintentional movement of the linkage.

BRIEF SUMMARY OF THE INVENTION

Object of the Invention

It is an aim of the invention to provide a control system which accurately determines and processes the draft force correctly for all operating conditions, so that movement of the linkage which is dependent on the detected draft force is correct. It is a further aim to provide a method for determining an accurate draft force of a vehicle having a linkage in all operating conditions.

Summary of the Invention

According to the invention, there is provided a vehicle control system for a vehicle having a continuously variable transmission (CVT), for controlling the height of a linkage on the vehicle and/or on an implement coupled with the vehicle, in which the linkage is automatically raised and lowered depending on a draft force detected by the vehicle, wherein an input draft force detected by sensors in the CVT or driveline is inputted into the control system and said system further processes said input draft force to provide an output draft force upon which movement of the linkage is based, wherein said control system processes the input draft force by at least one of the following:

compensating the input draft force detected during acceleration or deceleration, compensating the input draft detected whilst travelling along a slope, equalising the input draft force by applying a ramp function, and/or reducing the input draft force when the linkage is at a predetermined height.

The vehicle may be provided with an implement mounted to a linkage of the vehicle, e.g. a three-point linkage on a tractor, or the implement may be provided as a trailed implement wherein the vehicle is coupled with and controls the actuation of a linkage provided on the implement itself. Furthermore, the vehicle may be provided with a semi-mounted implement, wherein the vehicle is coupled with and controls the actuation of a linkage provided on the implement, the actuation of a linkage provided on the tractor, or the actuation of both.

Accordingly, there is provided a vehicle control system for controlling the height of a linkage on a vehicle having a CVT in which the linkage is automatically raised and lowered depending on a draft force detected by the vehicle, wherein an input draft force detected by sensors in the CVT or driveline is inputted into the control system and said system further processes said input draft force to provide an output draft force upon which movement of the linkage is based, wherein said control system processes the input draft force by compensating the input draft force detected during acceleration or deceleration, and/or compensating the input draft detected whilst travelling along a slope, and/or equalising the input draft force by applying a ramp function, and/or reducing the input draft force when the linkage is at a predetermined height.

There is also provided a vehicle control system for controlling the height of a linkage on an implement whereby the vehicle is provided with a CVT and in which the linkage is automatically raised and lowered depending on a draft force detected by the vehicle, wherein an input draft force detected by sensors in the CVT or driveline is inputted into the control system and said system further processes said input draft force to provide an output draft force upon which movement of the linkage is based, wherein said control system processes the input draft force by compensating the input draft force detected during acceleration or deceleration, and/or compensating the input draft detected whilst travelling along a slope, and/or equalising the input draft force by applying a ramp function, and/or reducing the input draft force when the linkage is at a predetermined height.

There is also provided a vehicle control system for a vehicle to be coupled with a semi-mounted implement, the control system controlling the height of a linkage on a vehicle and controlling the height of a linkage on an implement, whereby the vehicle is provided with a CVT and in which the vehicle linkage and the implement linkage are automatically raised and lowered depending on a draft force detected by the vehicle, wherein an input draft force detected by sensors in the CVT or driveline is inputted into the control system and said system further processes said input draft force to provide an output draft force upon which movement of the linkages is based, wherein said control system processes the input draft force by compensating the input draft force detected during acceleration or deceleration, and/or compensating the input draft detected whilst travelling along a slope, and/or equalising the input draft force by applying a ramp function, and/or reducing the input draft force when the linkage is at a predetermined height.

In this way, a draft force is accurately determined for all driving conditions and movement of the linkage which is dependent of the draft force can be done so safely, or limited accordingly. Moreover, by processing the draft force according to the driving conditions, the movement of the linkage can be made more smoothly, thus improving the comfort of the operator.

Preferably, the input draft force detected during acceleration or deceleration is compensated by taking the draft force applied to the mass of the vehicle into account for a given acceleration/deceleration value. This results in a more accurate draft force being detected by the system and avoiding unnecessary movement of the linkage.

Preferably, the mass of the vehicle is stored electronically and accessed by the control system.

More preferably, the mass of the vehicle can be varied by the operator. This allows changes in mass of the tractor to be taken into account, for example if it is carrying more or less fuel, or a greater/lighter counterbalance weight.

To compensate the input draft force whilst travelling along a slope, the control system preferably receives the angle of the slope, calculates a component of the drag force for that angle and takes that component into account to determine the output draft force.

The control system preferably sets a maximum output draft force when the input draft force exceeds a pre-determined value and the maximum output draft force is ramped down when the linkage is moved above a pre-determined height.

Preferably the pre-determined height is selected at a height where an attached implement cannot contact the ground.

In accordance with a further aspect of the invention, there is provided a method for controlling the height of a linkage on a vehicle or implement having a CVT in response to a draft force detected, wherein said method comprises the steps of:

detecting the draft force in the CVT or driveline of the vehicle and/or compensating the detected draft force during acceleration or deceleration of the vehicle and/or compensating the draft detected whilst travelling along a slope, and/or equalising the draft force by applying a ramp function, and/or reducing the draft force when the linkage is at a predetermined height.

The method ensures the correct movement of the linkage in response to the draft force detected for different driving conditions.

Preferably, a control system detects the draft force in the CVT or driveline of the vehicle as an initial step.

There is further provided a vehicle having a vehicle control system as described above. The vehicle is preferably an agricultural tractor. The vehicle comprises a continuously variable transmission (CVT).

There is further provided a control method for a vehicle having a continuously variable transmission (CVT), the control method for controlling the height of a linkage on the vehicle and/or on an implement coupled with the vehicle, the control method comprising the steps of:

detecting an input draft force by sensors in the CVT or driveline;

processing said input draft force to provide an output draft force upon which movement of the linkage is based; and raising and lowering the linkage based on the output draft force, wherein the step of processing comprises at least one of the following:

compensating the input draft force detected during acceleration or deceleration, compensating the input draft detected whilst travelling along a slope, equalising the input draft force by applying a ramp function, and/or reducing the input draft force when the linkage is at a predetermined height.

It will be understood that the method may be further adapted to incorporate the steps as described above in relation to the operation of the vehicle. There is also provided a controller for a vehicle configured to carry out the method as described above.

There is also provided a computer program product comprising a non-transitory storage medium readable by a processing circuit and storing instructions for execution by the processing circuit for performing the steps of the above method.

BRIEF DESCRIPTION OF THE DRAWINGS

The invention will now be described, by way of example only, with reference to the following drawings in which.

DETAILED DESCRIPTION OF THE INVENTION

Figure 1:
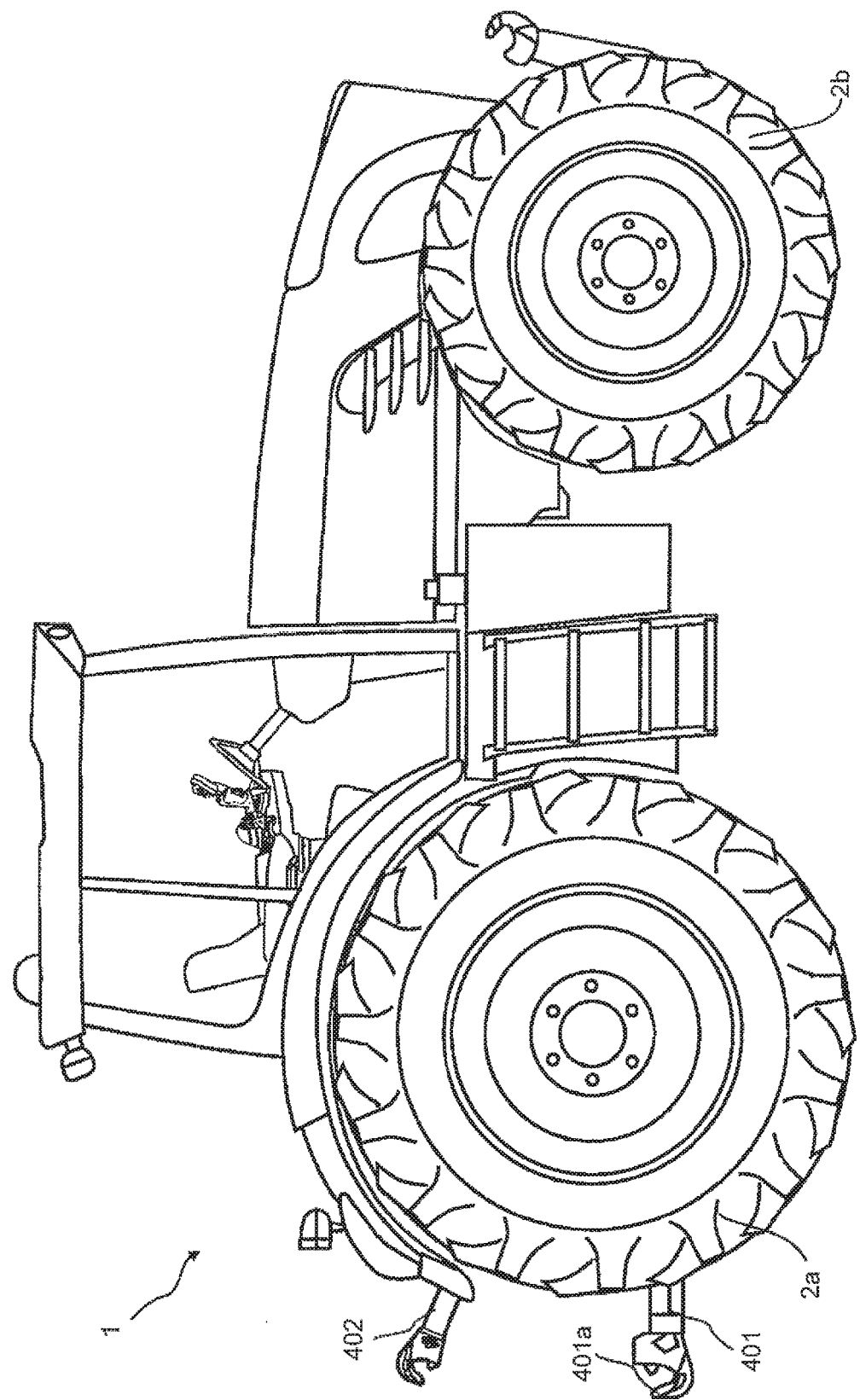
FIG. 1 is a side view of a tractor.

Referring to the drawings, an agricultural tractor 1 has a driveline 2 having a combustion engine 3, a continuously variable transmission, (CVT), T of the hydrostatic-mechanical split type and a rear axle housing 300. Combustion engine 3 is connected to the CVT, T by chassis part 310. Rear wheels 2a and front wheels 2a are driven by driveline 2.

A three-point linkage 400 is attached to the rear axle housing 300 and mainly consists of two lower lifting arms 401 to which an implement is attached. A plough 500 with ground engaging means 501 is attached to lower lifting arms 401. An additional top link 402 connects the implement 500 to the tractor 1. The top link 402 is of a hydraulic type adjustable in length to adjust the inclination of the plough 500 with the ground. The lower lifting arms 401 can be pivoted about axis A by respective hydraulic actuating cylinders 403 which move rocker arm 404 and lift rod 405. The height of the lifting arms can thus be changed by pivoting the lifting arms about axis A. By height of the linkage, it is meant the height of a part of the lifting arms relative to the ground. The hydraulic actuating cylinders 403 are supplied with an actuating fluid by a control valve 406. Control valve 406 controls which chamber 403a (to lift the implement) or chamber 403b (to lower the implement) of the hydraulic actuating cylinders 403 is charged with fluid. Control valve 406 is connected to a pump 407 which is driven by combustion engine 3 and connected to a fluid tank 108.

The position of the lower lift arms 401 is indirectly measured by a position sensor 409 which senses the position of a cam 410 attached to rocker arm 404.

An additional pressure sensor 411 is provided to measure the fluid pressure in the chamber 403a of the hydraulic actuating cylinders 403. The fluid in chamber 403a is compressed when the implement weight is fully taken up by the three-point linkage 400 and therefore a pressure increase indicates movement of the implement to a high position for transportation.

A tractor control unit 13 is provided to control various functions of the vehicle. The control unit 13 is electronically connected to various components such as the transmission and display and input devices via a CAN-BUS system, for example. The control unit 13 also contains software to drive the electronic linkage control system. The control unit 13 is connected to an input and display device 14 in the tractor cab 5 to receive inputs from the operator and to show information to the operator. The input and display device 14 includes a means to adjust and display parameters relating to the electronic linkage control system, such as the mix controller or the depth controller described above.

Position sensor 409, control valve 406 and pressure sensor 411 are connected to the control unit 13.

As described in WO2013/053645 of the applicant, the driveline 2 or transmission T a, which may be of hydrostatic mechanical split type transmission, contains sensors to determine various driving parameters such as draft force, vehicle speed, driving direction or vehicle stand still.

As draft force is constantly measured in the system, this parameter can be used to control the linkage based on an increased draft force applied by the implement.

So, by monitoring the draft force which is already done for transmission control and protection purposes, an increase or decrease of the draft or pull force can be detected and processed by the electronic linkage control system to provide modes such as draft, intermix or position control modes.

The draft force signal is fed into a tractor control unit 13 which is programmed to lift, or lower the linkage in response to the change as programmed.

Figure 3:
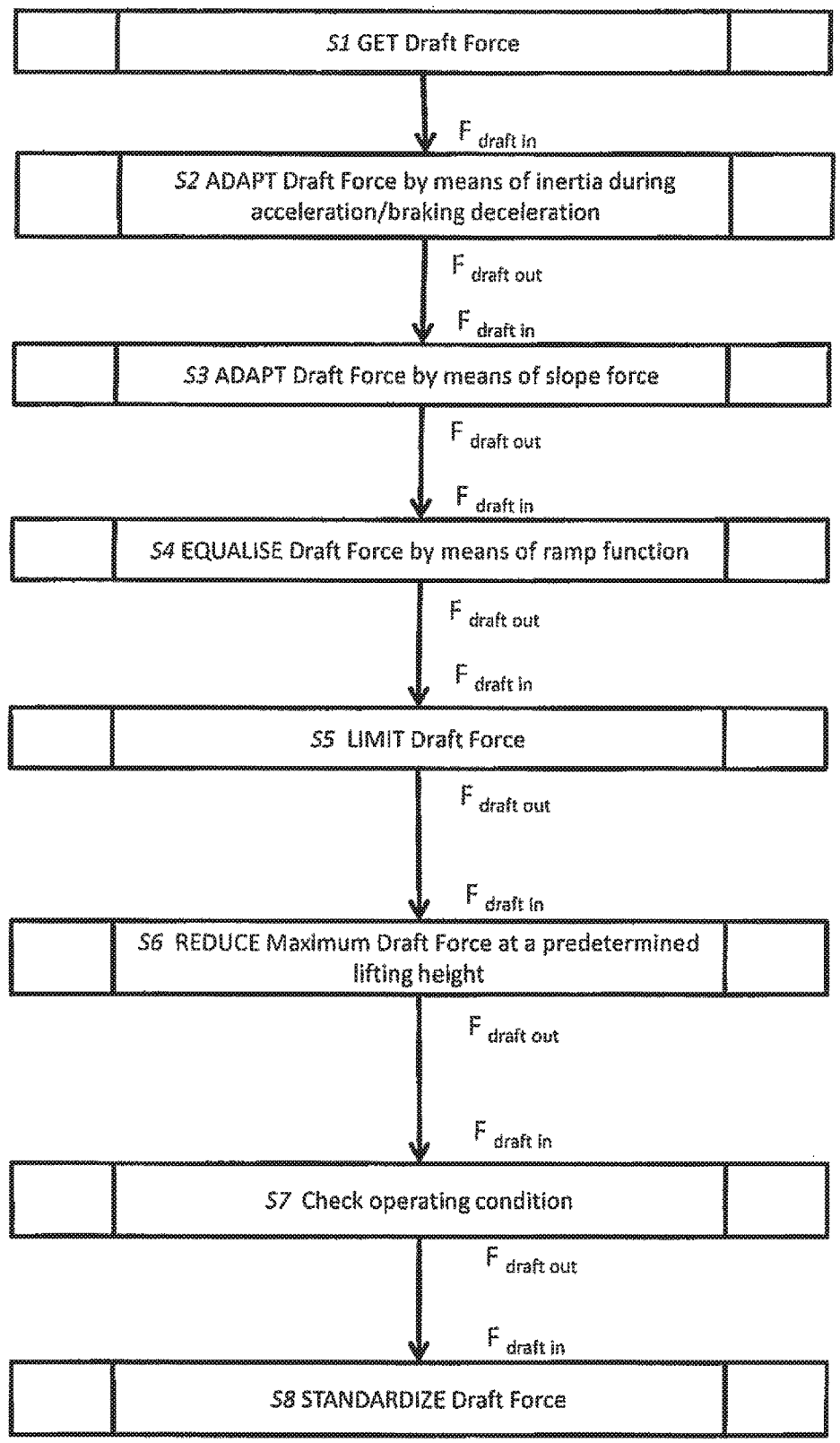
FIG. 3 is a flow chart showing the steps involved in determining a draft force in accordance with the invention.

In accordance with the invention, the control system with reference to FIG. 3 will now be described. The detected draft force as measured by the draft sensing means in the CVT, T is processed in a series of steps to provide a corrected draft force reading which takes account of the following conditions: when the vehicle is travelling uphill, when the vehicle is travelling downhill or, when the tractor is accelerating whilst the tractor is in the draft control mode. If these conditions are not taken into account, the detected draft force may result in unnecessary lifting and lowering of the linkage and an attached implement which may be dangerous.

Each of the steps is described by processing the draft force. A draft force $F_{draft\ in}$ is used to describe the value inputted into each step. A draft force $F_{draft\ out}$ is used to describe the value outputted from each step (that is after it has been processed by that step). The draft force $F_{draft\ out}$ from one step may then be used as an inputted value $F_{draft\ in}$ for a subsequent step and so on for a number of steps.

In a first step S1, the tractor control system will receive the detected draft force $F_{draft\ in}$ from the draft sensing means in the CVT as is known in the art. For this step, $F_{draft\ in}$ is simply the detected draft force from the CVT, T which increases when, the tractor experiences a higher resistance to the direction of travel, for example when a plough encounters a rock during ploughing.

But as the draft force $F_{draft\ in}$ from the CVT may also increase during acceleration or deceleration of the tractor or when travelling uphill or downhill, the draft force $F_{draft\ in}$, in accordance with the invention, is further processed by at least one further step to ensure that the linkage is correctly adjusted in accordance with the draft force.

In a second step S2, the control system adapts the detected draft force $F_{draft\ in}$ by taking the force due to the inertia of the tractor $F_{inertia}$ into account. $F_{inertia}$ is calculated using the equation:

$$F_{inertia} = M_{tractor} \times a_{tractor\ cvt} \times f$$

where $M_{tractor}$ is the mass of the tractor and is known from the factory settings and accessed from an electronic storage device connected to control unit 13; $a_{tractor\ cvt}$ is the acceleration of the tractor as determined by the CVT, and f is a factor which takes the relevance of inertia into account.

Factor f is entered by an operator using input device 14. Factor f is introduced to enable the operator to vary the tractor mass over a small range for the purpose of calculations performed by the control system. The mass of the tractor $M_{tractor}$ is usually a set value entered into a tractor control system during manufacture which cannot be changed by the operator, since its value is relied upon to control safety critical systems of the tractor such as anti-skid brakes. However, the mass of the tractor may change during operation, for example, if an additional ballast is attached to the tractor wheels, or to the tractor frame. This additional mass influences the behaviour during acceleration or deceleration and therefore must be taken into account when determining the drag force. Factor f therefore enables the mass of the tractor to be taken into account for the purpose of determining the drag force without affecting safety critical functions on the tractor.

The draft force outputted from step S2, $F_{draft\ out}$, is calculated by subtracting the force of inertia $F_{inertia}$ from the detected draft force $F_{draft\ in}$:

$$F_{draft\ out} = F_{draft\ in} - F_{inertia}$$

If the tractor is accelerating, the acceleration of the tractor $a_{tractor\ cvt}$ determined by the CVT, T would show a positive value so that the output draft force $F_{draft\ out}$ is decreased. If the vehicle is decelerating, the acceleration of the tractor $a_{tractor\ cvt}$ determined by the CVT, T would show a negative value so that the output draft force $F_{draft\ out}$ is increased.

In a third step, S3 the draft force $F_{draft\ out}$ calculated in step S2 is used as the draft force $F_{draft\ in}$. In this step, $F_{draft\ in}$ is further corrected to provide a draft force $F_{draft\ out}$ which takes into account the slope that the tractor is travelling along. This prevents any unintended movement of the linkages which may be caused by a change in draft force when driving up or down a slope.

The inclination of the slope α is measured from a gyroscope on the tractor. Typically, a gyroscope is included as part of the guidance system receiver 412 of the tractor. Alternatively, any sensor determining the inclination of the tractor relative to the ground may be used whether part of an existing system or used only for this purpose.

Using the formula:

$$F_{slope} = M_{tractor} \times G \times \sin \alpha$$

Where $F_{slope}$ is the draft force measured when the tractor is travelling along a slope (uphill or downhill), $M_{tractor}$ is the mass of the tractor and is known from the factory settings and accessed from an electronic storage device connected to control unit 13, and G is the force due to gravity.

The draft force due to the slope $F_{draft\ out}$ is corrected using the absolute value of $F_{slope}$ (as $F_{slope}$ may be negative or positive depending on uphill or downhill driving) in the following formula:

$$F_{draft\ out} = F_{draft\ in} + F_{slope}$$

(when the tractor is travelling downhill to increase the output draft force $F_{draft\ out}$) or $$F_{draft\ out} = F_{draft\ in} - F_{slope}$$

(when the tractor is travelling uphill to decrease the output draft force $F_{draft\ out}$)

If there is no slope, that is the tractor is travelling horizontally, then α is 0 and there is no $F_{slope}$ and step S3 is omitted by the control system.

Similar to the factor f described in step S2, the operator may input a factor f to adapt the mass of the tractor for determining the draft force in step S3, for example, if additional ballast is attached.

In a fourth step, S4 the control system normalizes the draft force $F_{draft\ in}$ (by means of a ramp function to make the control function more stable).

Figure 4:
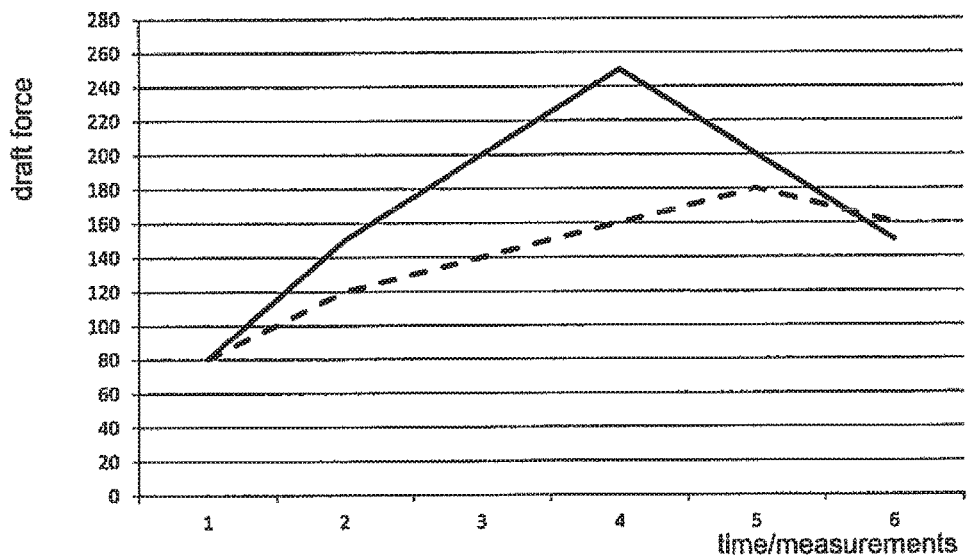
FIG. 4 shows a graph and a respective values table with reference to one of the steps shown in FIG. 3.

As shown in the graph and value table in FIG. 4, the draft force is measured periodically, for example, every 8 milliseconds. If the draft force $F_{draft\ in}$ (shown in the graph of FIG. 4 by the solid line), exceeds a certain value, of say 100 kN, the draft force is normalized to reduce the corresponding height adjustments of the linkage which would otherwise render the tractor unstable. The normalized force $F_{draft\ out}$ from step S4 is shown by the broken line in FIG. 4.

For example, if the draft force $F_{draft\ out}$ from step S3 determines a value of 80 kN, this value is used as $F_{draft\ in}$ for step S4. Step S4 will not change the value (since it is under 100 kN) and accordingly a $F_{draft\ out}$ value of 80 kN will be determined and used for the next step, S5. If the draft force $F_{draft\ in}$ for step S4 is 150 kN, as shown in the next time period in FIG. 4, the output force from step S4 will be an equalized draft force $F_{draft\ out}$ of 120 kN. If the next $F_{draft\ in}$ into step S4 is 200 kN, step S4 will only add 20 kN so that $F_{draft\ out}$ is 140 kN. In the same manner, a value of 250 kN in the next measurement results in a draft force $F_{draft\ out}$ of 160 kN being determined.

If the next draft force, $F_{draft\ in}$ is 200 kN, $F_{draft\ out}$ is calculated as 180 kN. The last draft force $F_{draft\ in}$ value shown in FIG. 4 is 150 kN which is lower than the previous $F_{draft\ out}$ of 180 KN. In this case, the draft force $F_{draft\ out}$ is reduced by 20 KN so that so that draft force $F_{draft\ out}$ of 160 kN is forwarded to step S5.

By reducing the increase in draft force for draft force $F_{draft\ in}$ values above a predetermined value, the draft force $F_{draft\ out}$ forwarded to the next step is reduced so that movement of the linkage is smoother than forwarding the draft forced received by a preceding step.

In a fifth step, S5 as is known in the art, if the draft force $F_{draft\ in}$ exceeds a predetermined value, the control system defaults to a maximum draft force $F_{draft\ out}$. This has the effect that for draft forces $F_{draft\ in}$ above a pre-determined force, a maximum draft force value $F_{draft\ out}$ will be used in another subsequent step.

Figure 5:
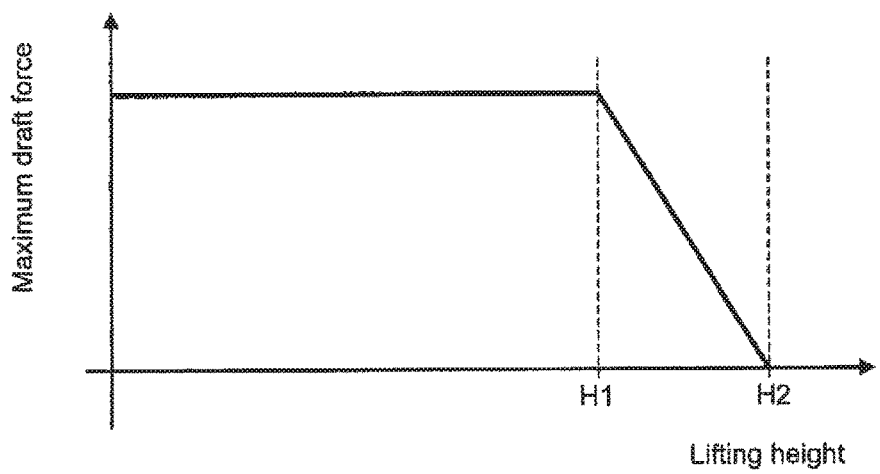
FIG. 5 shows a graph referring to one of the steps shown in FIG. 3.

In a sixth step, S6 the control system reduces the maximum draft force at a predetermined lifting height as shown in the graph in FIG. 5. Above a predetermined linkage height H1 which is indicative of a linkage holding an implement in a transport position, the control system reduces the draft force $F_{draft\ in}$ by using a linear ramp-down. For example, a linkage lifting height of 80% of the full lifting height may be defined as the predetermined height H1. When a draft force $F_{draft\ in}$ which would ordinarily result in moving the linkage above H1, the control system in step S6 works to continuously reduce the draft force until a maximum height H2 is reached. In between heights H1 and H2, the maximum draft force (at which the control system would stop to automatically change the height depending on the draft force) decreases with increasing height. In practice, the higher the height of pre-determined height H1 the less movement of the linkage there is in reaction to the draft force detected. This leads to a smoother adjustment of the linkage height as shown in FIG. 5.

In a seventh step S7, the operating condition of the tractor is checked in accordance with the applicant's prior art EP 15177251.4. If the operating condition of the tractor is correct the draft force $F_{draft\ out}$ will be progressed to a subsequent step.

In an eight step S8, the draft force signals may be standardized for compliance with other control systems on the tractor, as is known in the art.

It must be understand that the steps S2, S3, S4 and S6 may be used completely, partly or in the same or a different order without leaving the scope of the invention. For example, for a tractor having a low mass, the influence of slope and inertia may be so minor so that the steps S2 and S3 may be omitted. This may reduce computing capacity and hardware requirements.

Figure 2:
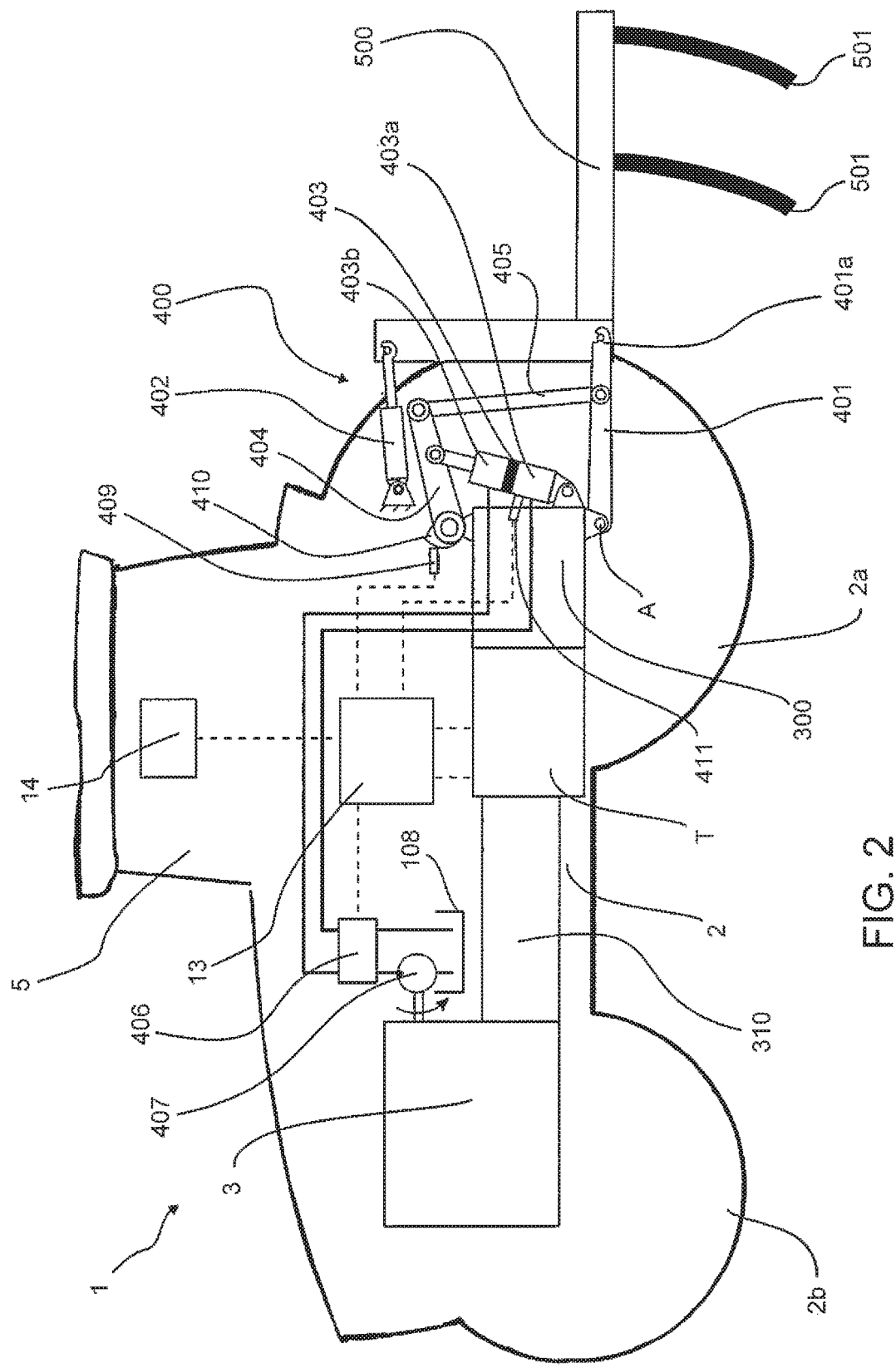
FIG. 2 is side view of a tractor showing a linkage at the rear in accordance with the invention.
Figure 6:
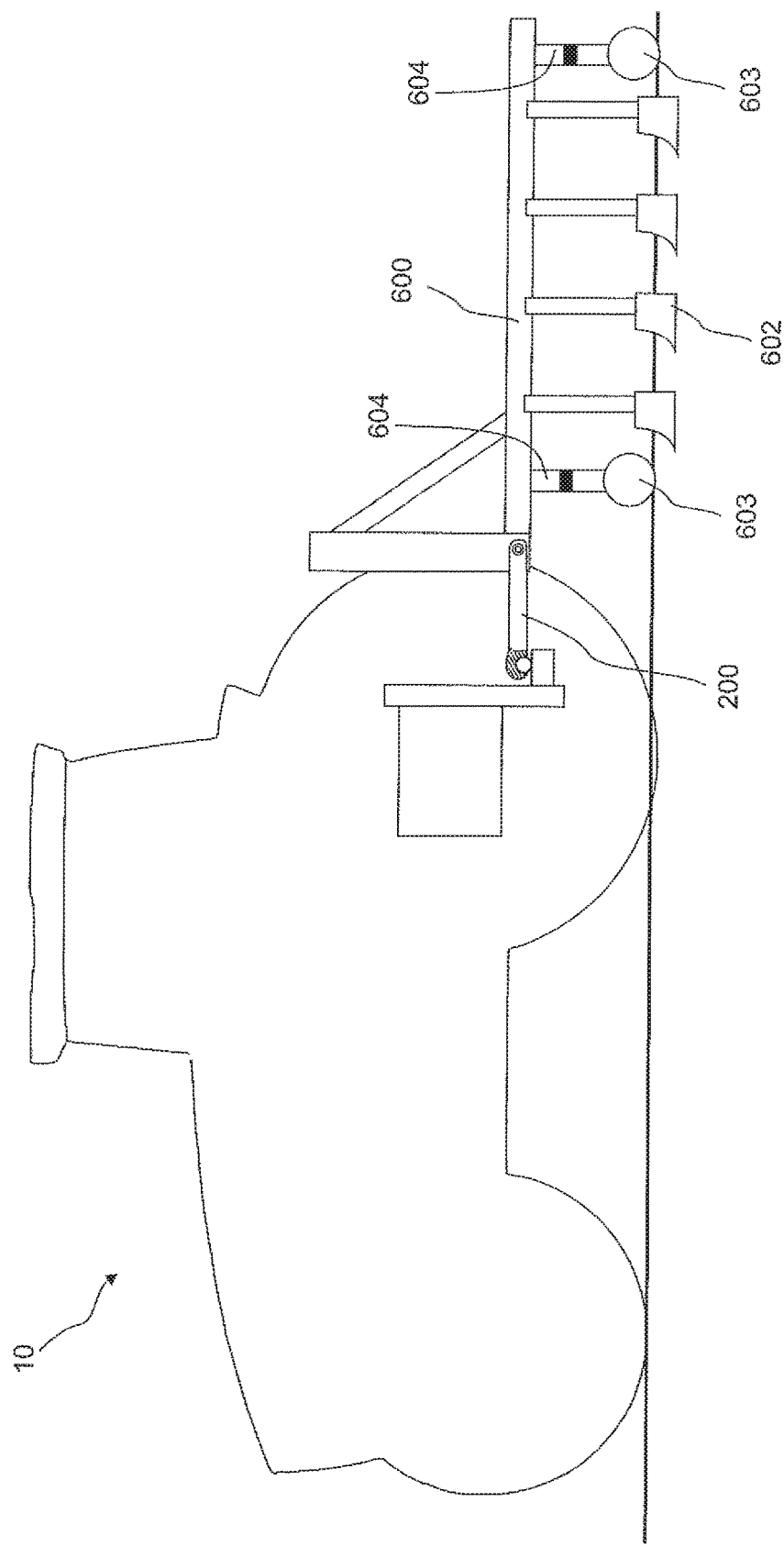
FIG. 6 is a side view of a tractor for control of a linkage on a trailed implement, in accordance with a further aspect of the invention.

In a further embodiment of the invention, in FIG. 6 a tractor 10 is shown which is coupled with a trailed implement 600 via a tow bar 200 or other suitable trailer connection. The trailed implement 600, which may comprise a plough or other similar tillage or soil cultivation apparatus, is provided with ground- or soil-engaging means 602, which are supported using at least one implement wheel 603. The height of the soil-engaging means 602, and accordingly their engagement with the ground, is controlled through actuation of an implement-mounted linkage or lift cylinder 604 coupled to the implement wheel 603, but it will be understood that other implement linkage configurations may be used. The actuation of the linkage 604 is controlled via a suitable communication connection with the tractor control unit 13 (shown in FIG. 2), in a similar manner as described above for a linkage-mounted implement.

Figure 7:
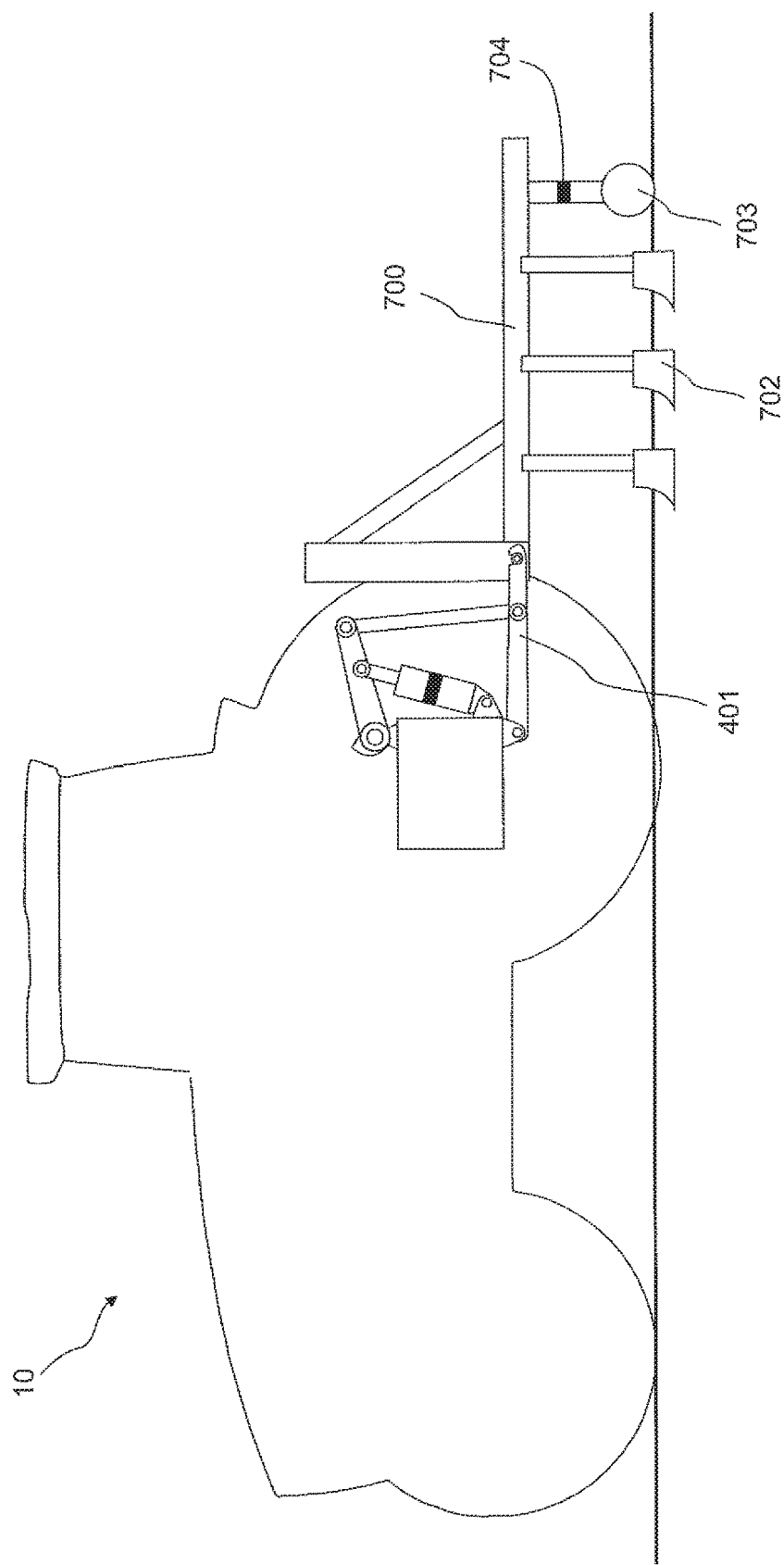
FIG. 7 is a side view of a tractor for control of a linkage on a semi-mounted implement, in accordance with a further aspect of the invention.

In a further embodiment of the invention, in FIG. 7 a tractor 10 is shown which is coupled with a semi-mounted implement 700 via the lower lifting arms 401. The semi-mounted implement 700, which may comprise a plough or other similar tillage or soil cultivation apparatus, is also provided with ground- or soil-engaging means 702, which are partly supported using at least one implement wheel 703. The height of the soil-engaging means 702, and accordingly their engagement with the ground, is controlled through actuation of an implement-mounted linkage or lift cylinder 704 coupled to the implement wheel 703 and the lower lifting arms 401 conjointly, but it will be understood that other implement linkage configurations may be used. The actuation of the linkage 704 is controlled via a suitable communication connection with the tractor control unit 13 (shown in FIG. 2), in a similar manner as described above for a linkage-mounted implement.

The invention provides a suitable control method for a vehicle control system for a vehicle having a CVT, to control the raising and lowering of a linkage provided on the vehicle or on an implement coupled with the vehicle. The invention may be provided as a controller for use in a vehicle, the controller arranged to perform the steps of the method. Additionally or alternatively, the invention may be provided as a computer program product comprising a non-transitory storage medium readable by a processing circuit and storing instructions for execution by the processing circuit for performing the steps of the method as outlined above.

The invention is not limited to the embodiments described herein, and may be modified or adapted without departing from the scope of the present invention.

The invention claimed is:

1. A vehicle control system for a vehicle having a continuously variable transmission (CVT), for controlling a height of a linkage on the vehicle and/or on an implement coupled with the vehicle, in which the linkage is automatically raised and lowered depending on a draft force detected by the vehicle, wherein an input draft force detected by sensors in the CVT or a driveline is inputted into the control system and said system further processes said input draft force to provide an output draft force upon which movement of the linkage is based, wherein said control system processes the input draft force by at least one of the following:
    compensating the input draft force detected during acceleration or deceleration,
    compensating the input draft detected while travelling along a slope, equalizing the input draft force by applying a ramp function, and reducing the input draft force when the linkage is at a predetermined height.

2. The vehicle control system as claimed in claim 1, wherein the input draft force detected during acceleration or deceleration is compensated by taking the draft force applied to the mass of the vehicle into account for a given acceleration/deceleration value.

3. The vehicle control system as claimed in claim 2, wherein the mass of the vehicle is stored electronically and accessed by the control system.

4. The vehicle control system as claimed in claim 2, wherein the mass of the vehicle can be varied by an operator.

5. The vehicle control system as claimed in claim 1, wherein to compensate the input draft force while travelling along a slope, the control system receives an angle of the slope, calculates a component of a drag force for that angle and takes that component into account to determine the output draft force.

6. The vehicle control system as claimed in claim 1, wherein the control system sets a maximum output draft force when the input draft force exceeds a pre-determined value and the maximum output draft force is ramped down when the linkage is moved above a pre-determined height.

7. The vehicle control system as claimed in claim 6, wherein the pre-determined height is selected at a height where an attached implement cannot contact the ground.

8. An agricultural tractor comprising the vehicle control system as claimed in claim 1.

9. A control method for a vehicle having a continuously variable transmission (CVT), the control method for controlling a height of a linkage on the vehicle and/or on an implement coupled with the vehicle, the control method comprising the steps of:

detecting an input draft force by sensors in the CVT or driveline;

processing said input draft force to provide an output draft force upon which movement of the linkage is based; and raising and lowering the linkage based on the output draft force, wherein the step of processing comprises at least one of the following:

compensating the input draft force detected during acceleration or deceleration, compensating the input draft detected whilst travelling along a slope, equalizing the input draft force by applying a ramp function, and reducing the input draft force when the linkage is at a predetermined height.

10. A controller for a vehicle configured to carry out the method as claimed in claim 9.

11. A computer program product comprising a non-transitory storage medium readable by a processing circuit and storing instructions for execution by the processing circuit for performing the steps of the method as claimed in claim 9.

* * * * *